(12) United States Patent
Tanaka

(10) Patent No.: US 11,034,169 B2
(45) Date of Patent: Jun. 15, 2021

(54) IMAGE FORMING APPARATUS CAPABLE OF MINIMIZING SIZE OF BLANK AREA, IMAGE FORMING METHOD

(71) Applicant: KYOCERA Document Solutions Inc., Osaka (JP)

(72) Inventor: Toshihiko Tanaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/855,194

(22) Filed: Apr. 22, 2020

(65) Prior Publication Data
US 2020/0338906 A1    Oct. 29, 2020

(30) Foreign Application Priority Data
Apr. 24, 2019    (JP) .............................. JP2019-082969

(51) Int. Cl.
*B41J 11/00*    (2006.01)
*B41J 2/045*    (2006.01)

(52) U.S. Cl.
CPC ......... *B41J 11/008* (2013.01); *B41J 2/04508* (2013.01); *B41J 11/0065* (2013.01)

(58) Field of Classification Search
CPC .... B41J 11/008; B41J 2/04508; B41J 11/0065
See application file for complete search history.

(56) References Cited

U.S. PATENT DOCUMENTS 10,009,508 B2 *  6/2018  Harada .............. H04N 1/00366

FOREIGN PATENT DOCUMENTS

JP           2005295169 A        10/2005

* cited by examiner

*Primary Examiner* — Thinh H Nguyen
(74) *Attorney, Agent, or Firm* — Alleman Hall Creasman & Tuttle LLP

(57) ABSTRACT

An image forming apparatus includes an image reading portion, a reduction processing portion, a data processing portion, and a print processing portion. The image reading portion reads image data of a print target sheet. The reduction processing portion reduces external shape data included in the image data based on a predetermined ratio. The data processing portion executes a blank forming process to form a blank area in the print target data by using the external shape data that has been reduced by the reduction processing portion, and executes an obfuscation process to obfuscate a border of the print target area. The print processing portion causes the image forming portion to form an image on the print target sheet based on the print target data that has been subjected to the processes executed by the data processing portion.

6 Claims, 6 Drawing Sheets

US 11,034,169 B2

IMAGE FORMING APPARATUS CAPABLE OF MINIMIZING SIZE OF BLANK AREA, IMAGE FORMING METHOD

INCORPORATION BY REFERENCE

This application is based upon and claims the benefit of priority from the corresponding Japanese Patent Application No. 2019-082969 filed on Apr. 24, 2019, the entire contents of which are incorporated herein by reference.

BACKGROUND

The present disclosure relates to an image forming apparatus that forms an image on a sheet, and to an image forming method.

There is known an image forming apparatus that forms a blank area at a peripheral edge portion of print target data to prevent developer from scattering outside a sheet. In addition, there is known a printer that executes a gradation process on an area that includes a border of the blank area in the print target data.

SUMMARY

An image forming apparatus according to an aspect of the present disclosure includes an image forming portion, an image reading portion, a reduction processing portion, a data processing portion, and a print processing portion. The image forming portion forms an image on a sheet. The image reading portion reads image data of a print target sheet at, in a sheet conveyance direction, an upstream of an image formation position where the image forming portion forms the image, in a sheet conveyance path. The reduction processing portion reduces external shape data included in the image data read by the image reading portion, based on a ratio of a size of a print target area that is set in the print target data, to a size of the print target sheet, the external shape data representing an external shape of the sheet. The data processing portion executes a blank forming process to form a blank area in the print target data by using the external shape data that has been reduced by the reduction processing portion. In addition, the data processing portion executes an obfuscation process to obfuscate a border of the print target area. The print processing portion causes the image forming portion to form an image on the print target sheet based on the print target data that has been subjected to the blank forming process and the obfuscation process executed by the data processing portion.

An image forming method according to another aspect of the present disclosure is executed in an image forming apparatus including an image forming portion configured to form an image on a sheet, and an image reading portion configured to read image data of a print target sheet at, in a sheet conveyance direction, an upstream of an image formation position where the image forming portion forms the image, in a sheet conveyance path. The image forming method includes: reducing external shape data included in the image data read by the image reading portion, based on a ratio of a size of a print target area that is set in the print target data, to a size of the print target sheet, the external shape data representing an external shape of the sheet; executing a blank forming process to form a blank area in the print target data by using the external shape data that has been reduced in the reducing, and executing an obfuscation process to obfuscate a border of the print target area; and causing the image forming portion to form an image on the print target sheet based on the print target data that has been subjected to the blank forming process and the obfuscation process.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Forming Apparatus 10]

Figure 1:
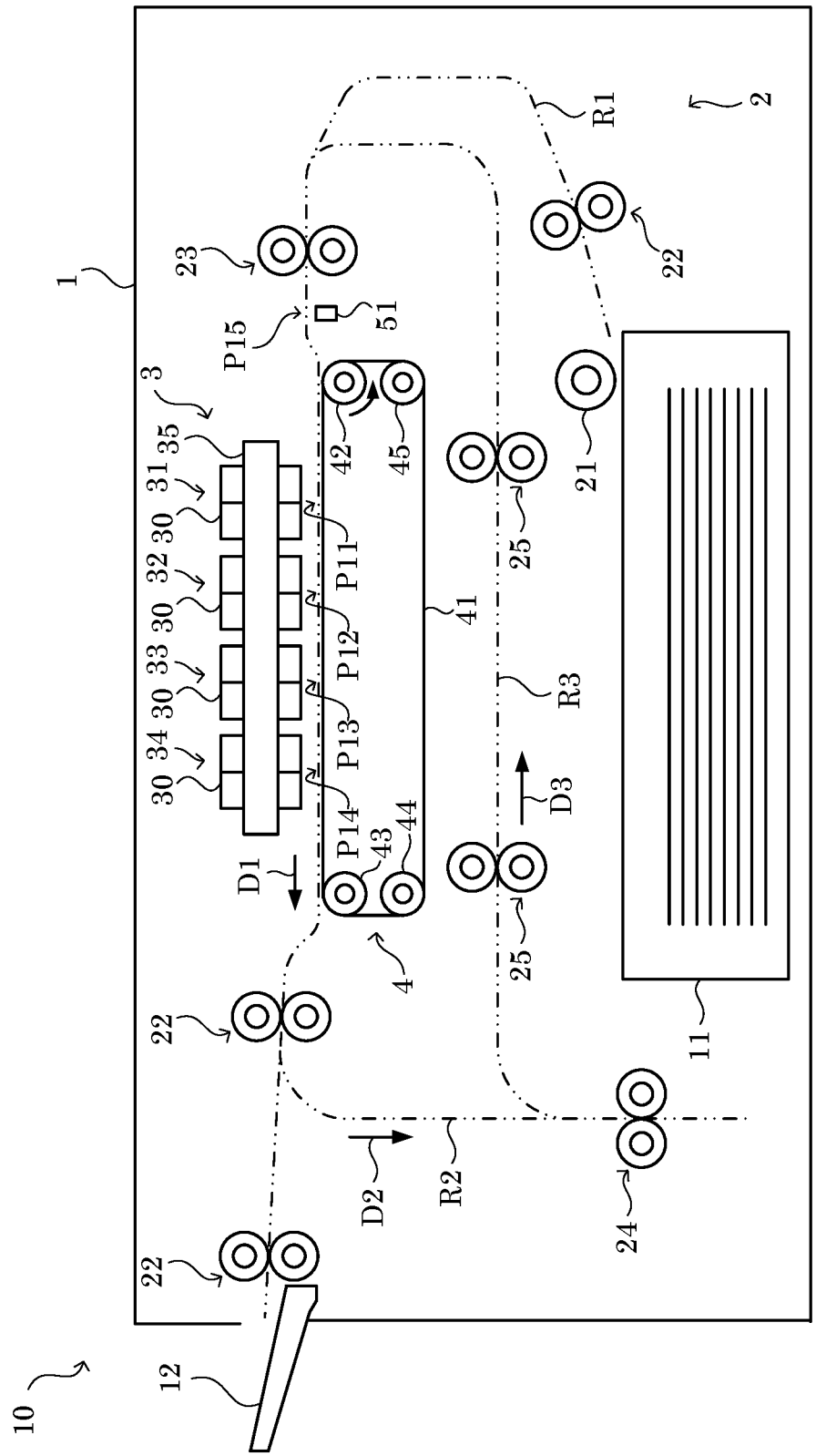
FIG. 1 is a diagram showing a configuration of an image forming apparatus according to an embodiment of the present disclosure.
Figure 2:
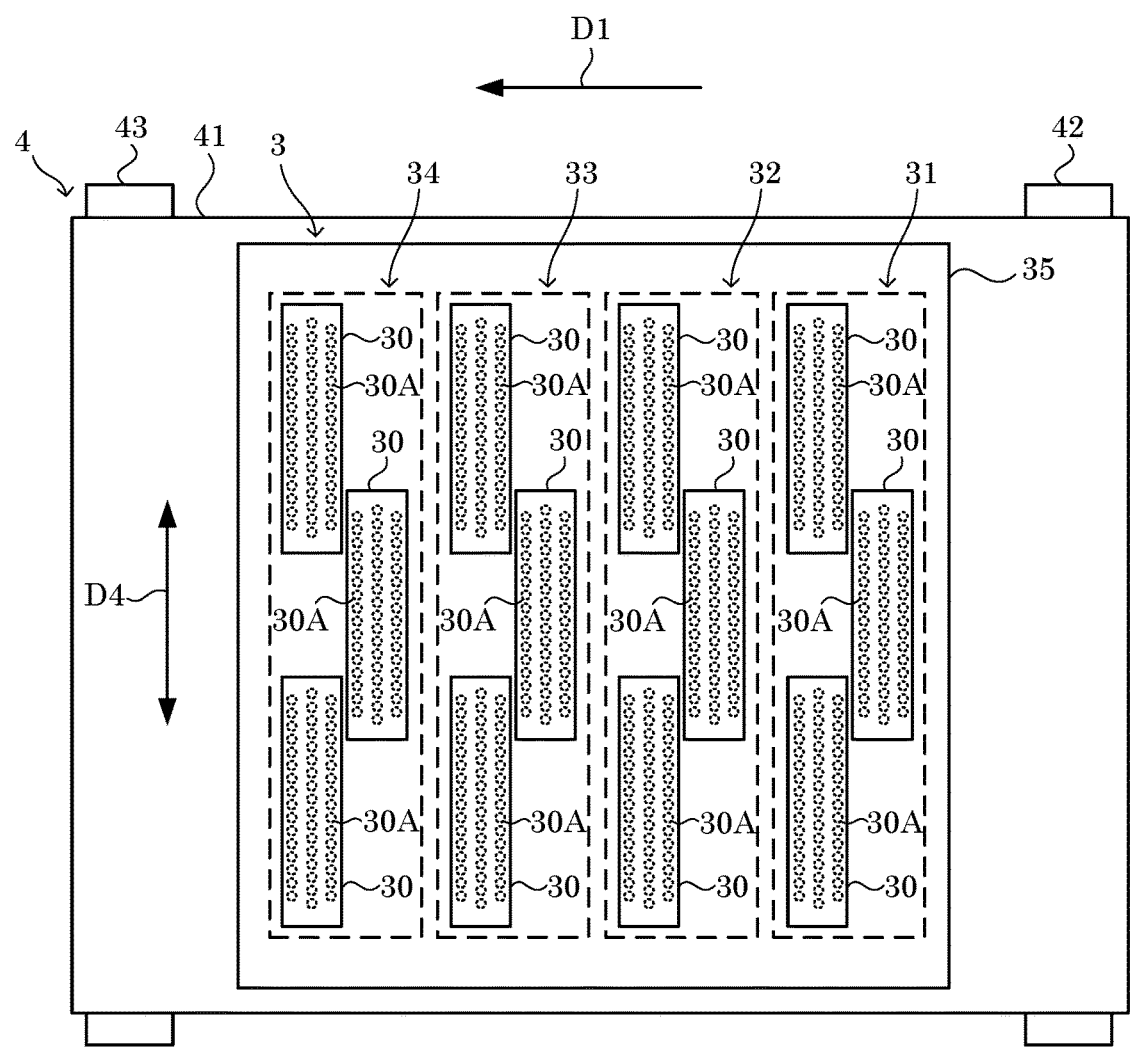
FIG. 2 is a diagram showing a configuration of an image forming portion of the image forming apparatus according to the embodiment of the present disclosure.

First, a configuration of an image forming apparatus 10 according to the embodiment of the present disclosure is described with reference to FIG. 1 to FIG. 3. Here, FIG. 1 is a cross-sectional diagram showing a configuration of the image forming apparatus 10. In addition, FIG. 2 is a plan diagram showing a configuration of an image forming portion 3. It is noted that in FIG. 1, sheet conveyance paths R1, R2, and R3 are indicated by two-dot chain lines.

The image forming apparatus 10 is a printer configured to form an image on a sheet by an inkjet method. It is noted that the present disclosure may be applied to an image forming apparatus such as a facsimile apparatus, a copier, or a multifunction peripheral that is configured to form an image on a sheet by an inkjet method.

Figure 3:
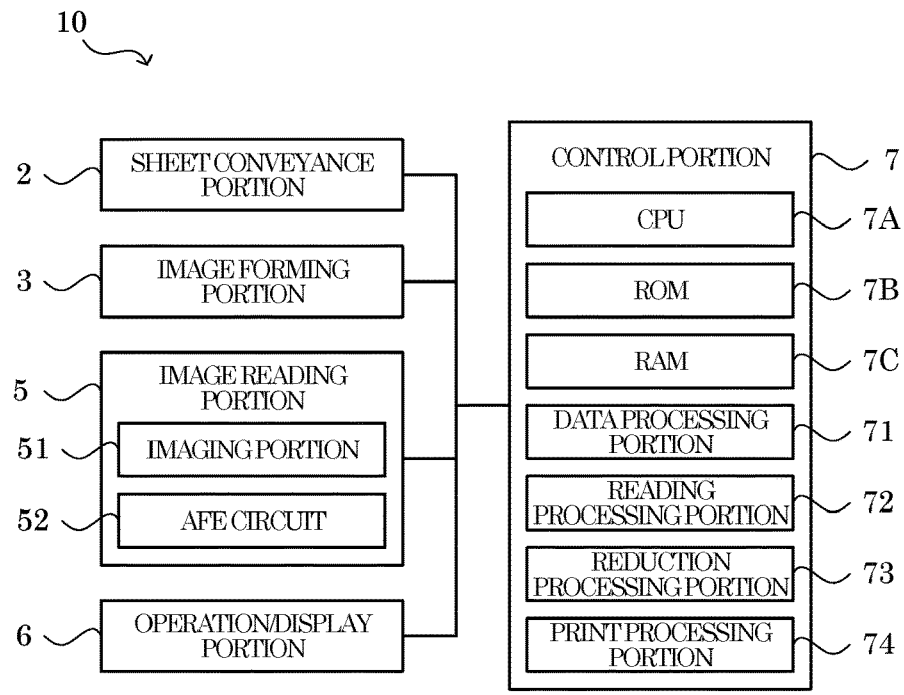
FIG. 3 is a block diagram showing a system configuration of the image forming apparatus according to the embodiment of the present disclosure.

As shown in FIG. 1 and FIG. 3, the image forming apparatus 10 includes a housing 1, a sheet conveyance portion 2, an image forming portion 3, an image reading portion 5, an operation/display portion 6, and a control portion 7.

The housing 1 stores components of the image forming apparatus 10. A sheet feed cassette 11 is attached in the housing 1 in a detachable manner. Sheets on which images are to be formed are stored in the sheet feed cassette 11. For example, the sheets stored in the sheet feed cassette 11 are sheet-like materials such as sheets of paper, sheets of coated paper, postcards, envelopes, and OHP sheets. A sheet discharge tray 12 is provided at an outer side surface of the housing 1. A sheet with an image formed there by the image forming portion 3 is discharged onto the sheet discharge tray 12.

The sheet conveyance paths R1, R2, and R3 for guiding a sheet conveyed by the sheet conveyance portion 2 are provided in the housing 1. The sheet conveyance path R1 is a path in which the sheet is moved from the sheet feed cassette 11 to the sheet discharge tray 12 via image formation positions P11 to P14 at which images are formed by the image forming portion 3. The sheet conveyance path R2 is used to reverse a sheet after an image is formed thereon by the image forming portion 3. The sheet conveyance path R3 is a path in which a sheet reversed in the sheet conveyance path R2 is re-conveyed to the image forming portion 3.

It is noted that the image formation position P11 is a position in the sheet conveyance path R1 where a line head 31 of the image forming portion 3 is disposed. In addition, the image formation position P12 is a position in the sheet conveyance path R1 where a line head 32 of the image forming portion 3 is disposed. In addition, the image formation position P13 is a position in the sheet conveyance path R1 where a line head 33 of the image forming portion 3 is disposed. In addition, the image formation position P14 is a position in the sheet conveyance path R1 where a line head 34 of the image forming portion 3 is disposed.

The sheet conveyance portion 2 conveys a sheet in the housing 1. As shown in FIG. 1, the sheet conveyance portion 2 includes a pickup roller 21, pairs of first conveyance rollers 22, a pair of resist rollers 23, a pair of second conveyance rollers 24, a pair of third conveyance rollers 25, and a conveyance unit 4.

The pickup roller 21 is configured to pick up sheets one by one from the sheet feed cassette 11 and feed the sheets to the sheet conveyance path R1. The pairs of first conveyance rollers 22 are provided in the sheet conveyance path R1 and configured to convey the sheets in a conveyance direction D1 (see FIG. 1). The pair of resist rollers 23 convey a sheet to the image formation positions P11 to P14 of the image forming portion 3 at predetermined timings.

The pair of second conveyance rollers 24 are provided in the sheet conveyance path R2 and configured to convey a sheet in a conveyance direction D2 (see FIG. 1), and then convey the sheet in a reverse direction to the conveyance direction D2 to feed the sheet to the sheet conveyance path R3. The pair of third conveyance rollers 25 are provided in the sheet conveyance path R3 and convey the sheet in a conveyance direction D3 (see FIG. 1).

The image forming portion 3 forms an image using ink based on image data on a sheet supplied from the sheet feed cassette 11. As shown in FIG. 1, the image forming portion 3 includes line heads 31, 32, 33, and 34 and a head frame 35 supporting the line heads, wherein the line heads 31, 32, 33, and 34 respectively correspond to colors black, cyan, magenta, and yellow. The head frame 35 is supported by the housing 1. It is noted that the number of the line heads included in the image forming portion 3 is not limited to 4 (four). For example, the image forming portion 3 may be configured to form only monochrome images.

The line heads 31 to 34 are what is called line-head-type recording heads. That is, the image forming apparatus 10 is a what is called line-head-type image forming apparatus. As shown in FIG. 2, the line heads 31 to 34 are elongated in a width direction D4 perpendicular to the conveyance direction D1. Specifically, each of the line heads 31 to 34 has a length in the width direction D4 that corresponds to the width of a sheet of the maximum size among a plurality of sizes of sheets that can be stored in the sheet feed cassette 11. The line heads 31 to 34 are fixed to the head frame 35 at regular intervals along the conveyance direction D1.

As shown in FIG. 2, each of the line heads 31 to 34 includes a plurality of recording heads 30. The recording heads 30 eject ink toward a sheet conveyed by the conveyance unit 4. Specifically, a plurality of nozzles 30A (see FIG. 2) for ejecting ink are provided on a facing surface of each of the recording heads 30, each of the nozzles 30A having an opening, the facing surface facing a conveyance belt 41 (see FIG. 1). In addition, each of the recording heads 30 includes a plurality of pressurizing chambers (not shown), a plurality of piezoelectric elements (not shown), and a plurality of communication flow paths, the pressurizing chambers respectively corresponding to the nozzles 30A, the piezoelectric elements respectively provided in the pressurizing chambers, the communication flow paths respectively communicating with the pressurizing chambers. Upon application of a predetermined driving voltage, each of the piezoelectric elements causes ink to be ejected from a nozzle 30A that corresponds to a pressurizing chamber in which the piezoelectric element is provided. Specifically, each piezoelectric element pressurizes ink stored in the corresponding pressurizing chamber and thereby causes ink to be ejected from the corresponding nozzle 30A.

In the present embodiment, in the line head 31, three recording heads 30 are arranged in zigzag along the width direction D4. In addition, in each of the line heads 32 to 34, as in the line head 31, three recording heads 30 are arranged in zigzag along the width direction D4. Ink of colors corresponding to the line heads 31 to 34 is supplied to the line heads 31 to 34 from corresponding ink containers (not shown). It is noted that FIG. 2 shows a state of the image forming portion 3 viewed from the upper side of FIG. 1.

The conveyance unit 4 conveys a sheet at the image formation positions P11 to P14. As shown in FIG. 1, the conveyance unit 4 is disposed below the line heads 31 to 34. As shown in FIG. 1 and FIG. 3, the conveyance unit 4 includes the conveyance belt 41 and stretching rollers 42 to 45.

The conveyance belt 41 conveys a sheet in a posture where a surface of the sheet faces the line heads 31 to 34. The conveyance belt 41 is stretched over the stretching rollers 42 to 45. The stretching rollers 42 and 43 are provided separated from each other by a predetermined distance in a left-right direction of the housing 1 (the up-down direction in FIG. 1). The stretching roller 44 is disposed below the stretching roller 43. The stretching roller 45 is disposed below the stretching roller 42.

The stretching roller 42 is rotationally driven by a rotational driving force supplied from a motor (not shown) to rotate in a direction indicated by an arrow in FIG. 1. This allows the conveyance belt 41 to cyclically move such that the sheet is conveyed in the conveyance direction D1 (see FIG. 1). It is noted that the conveyance unit 4 also includes an air suction unit (not shown) that sucks the air through a lot of pass-through holes formed in the conveyance belt 41 so that the sheet is attracted by the conveyance belt 41.

The image reading portion 5 reads an image of the sheet at a reading position P15 (see FIG. 1) that is upstream of the image formation positions P11 to P14 of the image forming portion 3 in the conveyance direction D1 in the sheet conveyance path R1. As shown in FIG. 1 and FIG. 3, the image reading portion 5 includes an imaging portion 51 and an AFE (Analog Front End) circuit 52.

As shown in FIG. 1, the imaging portion 51 is disposed at the reading position P15 so as to face a sheet conveyed in the sheet conveyance path R1. The imaging portion 51 is configured to read one line of image data along a main scanning direction that is the same as the width direction D4, from a sheet that passes the reading position P15. For example, the imaging portion 51 is an image sensor such as a CIS (Contact Image Sensor) that includes a light emitting portion and a light receiving portion. The light emitting portion emits one line of light toward the reading position P15, the one line of light extending in the main scanning direction. The light receiving portion is configured to receive light that is emitted from the light emitting portion and reflected by the sheet passing the reading position P15, and output an analog electric signal that corresponds to a received amount of light.

The AFE circuit 52 is an electronic circuit configured to convert an analog electric signal output from the light receiving portion of the imaging portion 51, into a digital signal (image data). For example, the AFE circuit 52 converts the electric signal output from the light receiving portion of the imaging portion 51, into image data in which a pixel density is represented with 256 gradations on a scale of 0 to 255. The AFE circuit 52 outputs the converted image data to the control portion 7.

The operation/display portion 6 includes a display portion and an operation portion, wherein the display portion is, for example, a liquid crystal display and displays various types of information in response to control instructions from the control portion 7, and the operation portion is, for example, operation keys or a touch panel for inputting various types of information to the control portion 7 in response to user operations.

The control portion 7 includes control equipment such as a CPU 7A, a ROM 7B, and a RAM 7C. The CPU 7A is a processor that executes various calculation processes. The ROM 7B is a nonvolatile storage device in which various information such as control programs for causing the CPU 7A to execute various processes are preliminarily stored. The RAM 7C is a volatile storage device that is used as a temporary storage memory (working area) for the various processes executed by the CPU 7A. In the control portion 7, the CPU 7A executes the various control programs stored in advance in the ROM 7B. This allows the image forming apparatus 10 to be controlled comprehensively by the control portion 7. It is noted that the control portion 7 may be formed as an electronic circuit such as an integrated circuit (ASIC), and may be a control portion provided independently of a main control portion that comprehensively controls the image forming apparatus 10.

Meanwhile, there is known a conventional image forming apparatus that forms a blank area at a peripheral edge portion of print target data (print target data of the present disclosure) to prevent developer from scattering outside a sheet. In addition, in the conventional image forming apparatus, the blank area provided in the print target data is set to have a larger size than a minimum size required to prevent scattering of the developer, so as to absorb the individual difference in the shape of the sheet, and a displacement of the sheet in the width direction D4 that occurs during the conveyance of the sheet.

On the other hand, the blank area may be provided in the print target data based on the shape of a print target sheet (a print target sheet of the present disclosure) read by the image reading portion 5. Specifically, external shape data that is included in the image data read by the image reading portion 5, is reduced based on a ratio of a size of a print target area (a print target area of the present disclosure) that is set in the print target data, to a size of the print target sheet. Subsequently, the blank area is formed in the print target data by overlaying the reduced external shape data on the print target data, and masking the outside of the external shape data. This configuration eliminates the need to consider the individual difference in the shape of the sheet and the displacement of the sheet in the width direction D4, and thus makes it possible to set the size of the blank area to the minimum size required to prevent scattering of the developer.

Here, the external shape data included in the image data read by the image reading portion 5 may have an irregular outline due to, for example, the reading resolution of the image reading portion 5 or the individual difference of imaging elements constituting the imaging portion 51. In this case, the blank area that is formed in the print target data based on the external shape data has an irregular border, too, and this degrades the image formed on the print target sheet in appearance.

On the other hand, the image forming apparatus 10 according to the embodiment of the present disclosure, as described below, is configured to minimize the size of the blank area provided in the print target data, while restricting the image formed on the print target sheet from being degraded in appearance.

Specifically, a print control program for causing the CPU 7A to execute a print control process (see the flowchart of FIG. 7) is stored in advance in the ROM 7B of the control portion 7. It is noted that the print control program may be recorded on a computer-readable recording medium such as a CD, a DVD, or a flash memory, and may be installed from the recording medium to a nonvolatile storage device provided in the image forming apparatus 10.

As shown in FIG. 3, the control portion 7 includes a data processing portion 71, a reading processing portion 72, a reduction processing portion 73, and a print processing portion 74 (a print processing portion of the present disclosure). Specifically, the control portion 7 executes the print control program stored in the ROM 7B by using the CPU 7A. This allows the control portion 7 to function as the data processing portion 71, the reading processing portion 72, the reduction processing portion 73, and the print processing portion 74.

The data processing portion 71 executes an obfuscation process to obfuscate a border of the print target area set in the print target data.

Specifically, first, when a print process is executed to print the print target data, the data processing portion 71 acquires the print target data together with first size information and second size information, the first size information indicating a size of the print target sheet, the second size information indicating a size of the print target area. It is noted that the first size information and the second size information are input by user operations performed on a setting screen for setting execution conditions of the print process.

Next, the data processing portion 71 executes a process of adapting the size of the print target data to the size of the print target sheet based on the first size information. For example, the data processing portion 71 adapts the size of the print target data to the size of the print target sheet by executing an expansion process, a reduction process, or a trimming process on the print target data. It is noted that the data processing portion 71 may change the size of the print target data to be slightly larger than the size of the print target sheet.

Next, the data processing portion 71 sets the print target area in the print target data based on the second size information.

Subsequently, the data processing portion 71 executes the obfuscation process on the print target data in which the print target area has been set. For example, the obfuscation process is a density reduction process to reduce the image density of a processing target area that includes the border of the print target area, gradually, namely, stepwise or continuously, toward the outside of the print target area. For example, the processing target area is a belt-like area formed to extend along a border of the print target area, have a predetermined width, and have the border of the print target area at the center thereof. It is noted that the obfuscation process may be, for example, a blurring process or a mosaic process.

Figure 4:
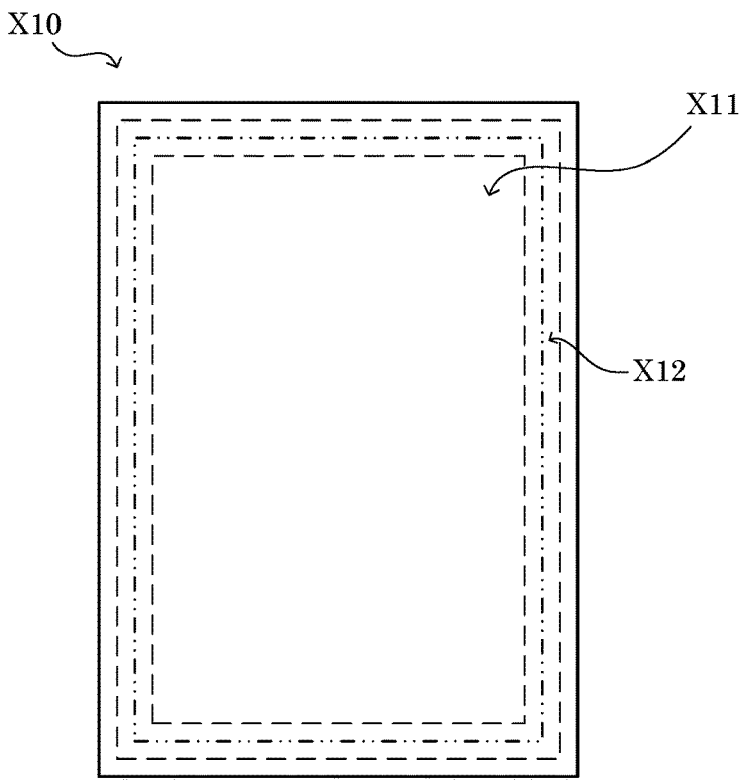
FIG. 4 is a diagram showing an example of print target data printed by the image forming apparatus according to the embodiment of the present disclosure.

FIG. 4 shows print target data X10 that is an example of the print target data printed by the image forming apparatus 10. The size of the print target data X10 corresponds to the size of the print target sheet. For example, the print target data X10 is photograph image data. A print target area X11 is set in the print target data X10 based on the second size information. In FIG. 4, the border of the print target area X11 is indicated by a two-dot chain line. In addition, the obfuscation process is executed on a processing target area X12 that includes the border of the print target area X11 of the print target data X10. It is noted that in FIG. 4, the processing target area X12 is indicated as an area surrounded by thin dotted lines. It is noted that the processing target area X12 may include all areas outside the print target area X11.

When the print process is executed, the reading processing portion 72 causes the image reading portion 5 to read image data of the print target sheet.

Figure 5:
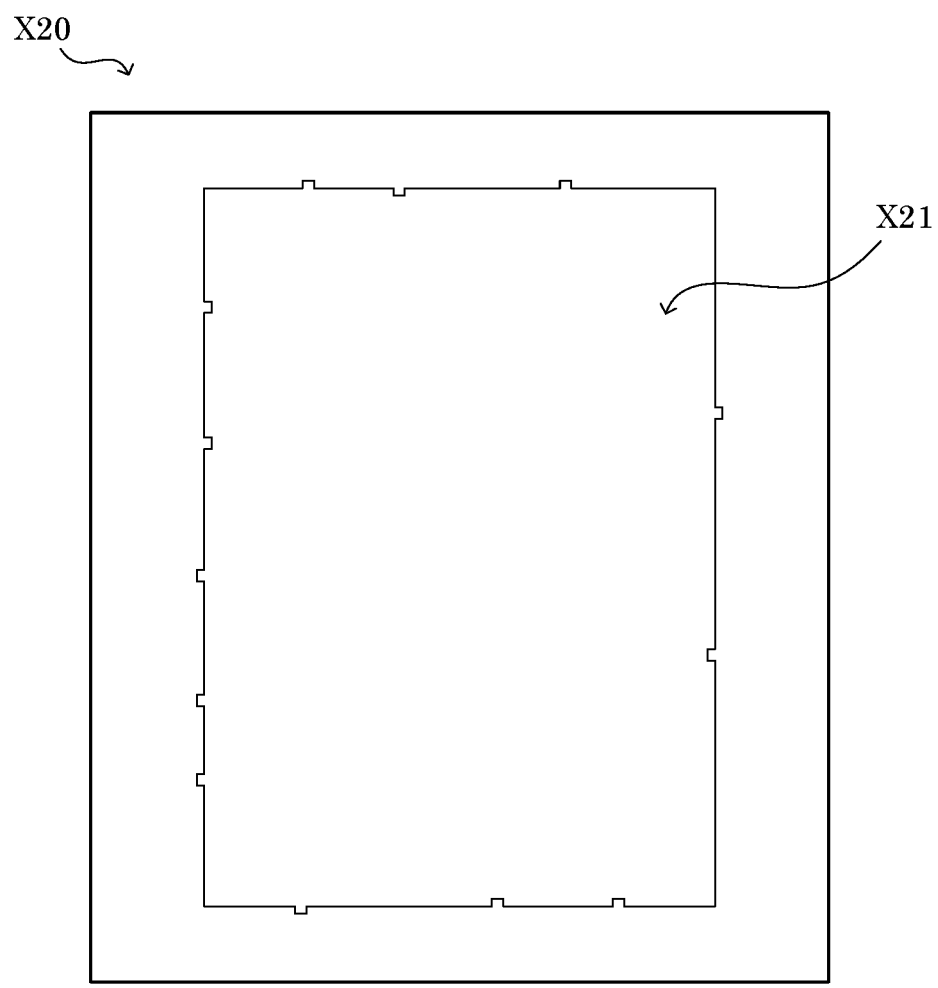
FIG. 5 is a diagram showing an example of image data read by the image forming apparatus according to the embodiment of the present disclosure.

FIG. 5 shows image data X20 that is an example of image data of the print target sheet read by the image reading portion 5. The image data X20 includes external shape data X21. As shown in FIG. 5, the outline of the external shape data X21 is irregular. This irregularity occurs due to, for example, the reading resolution of the image reading portion 5 or the individual difference of imaging elements constituting the imaging portion 51.

The reduction processing portion 73 reduces the external shape data included in the image data read by the reading processing portion 72, based on the ratio of the size of the print target area to the size of the print target sheet.

Specifically, the reduction processing portion 73 calculates the reduction rate of the external shape data based on the first size information and the second size information. Specifically, the reduction processing portion 73 reduces the external shape data in the conveyance direction D1 based on the ratio of the size of the print target area in the conveyance direction D1 to the size of the print target sheet in the conveyance direction D1. In addition, the reduction processing portion 73 reduces the external shape data in the width direction D4 based on the ratio of the size of the print target area in the width direction D4 to the size of the print target sheet in the width direction D4. It is noted that the reduction rate in the conveyance direction D1 may be the same as the reduction rate in the width direction D4.

The data processing portion 71 executes a blank forming process on the print target data that has been subjected to the obfuscation process, wherein in the blank forming process, the external shape data that has been reduced by the reduction processing portion 73 is used to form a blank area. For example, the blank forming process is a mask process to form the blank area by overlaying the external shape data on the print target data, and masking the outside of the external shape data. It is noted that the blank forming process may be a trimming process using the external shape data.

Specifically, after the external shape data is reduced by the reduction processing portion 73, the data processing portion 71 generates, based on the reduced external shape data, mask image data for covering the outside of the external shape data. Subsequently, the data processing portion 71 executes, based on the generated mask image data, the mask process on the print target data that has been subjected to the obfuscation process. This allows the blank area to be provided in the print target data.

Figure 6:
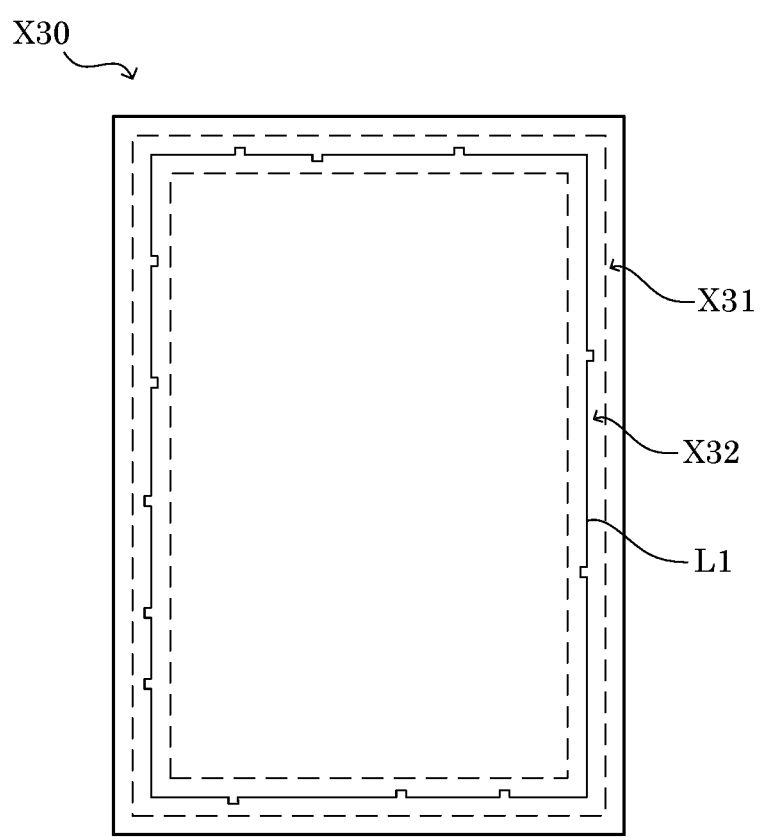
FIG. 6 is a diagram showing an example of the print target data printed by the image forming apparatus according to the embodiment of the present disclosure.

FIG. 6 shows print target data X30 that is an example of the print target data after the obfuscation process and the blank forming process are executed by the data processing portion 71. The print target data X30 includes a blank area X31 formed in the blank forming process. It is noted that in FIG. 6, the border of the blank area X31 is indicated by a thin line L1. In addition, the print target data X30 includes a processing target area X32 that has been subjected to the obfuscation process. It is noted that in FIG. 6, the processing target area X32 is indicated as an area surrounded by thin dotted lines.

The print processing portion 74 causes the image forming portion 3 to form an image on the print target sheet based on the print target data that has been subjected to the obfuscation process and the blank forming process executed by the data processing portion 71.

[Print Control Process]

Figure 7:
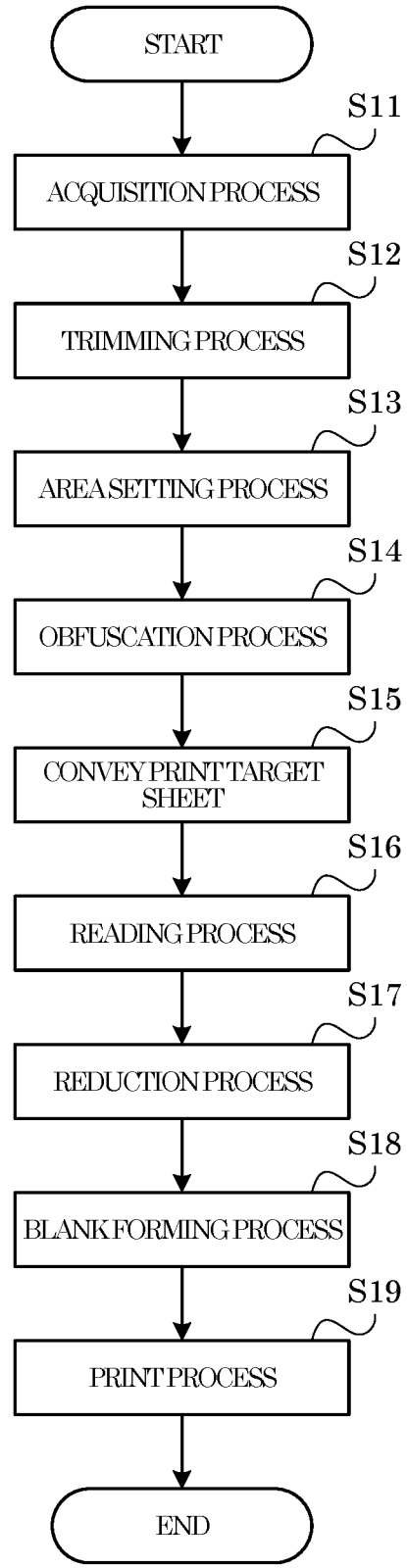
FIG. 7 is a flowchart showing an example of a print control process executed by the image forming apparatus according to the embodiment of the present disclosure.

In the following, with reference to FIG. 7, a description is given of an example of the procedure of the print control process executed by the control portion 7 in the image forming apparatus 10. Here, steps S11, S12, . . . represent numbers assigned to the processing procedures (steps) executed by the control portion 7. It is noted that the print control process is executed in response to an input of an operation instructing to execute the print process.

<Step S11>

First, in step S11, the control portion 7 executes an acquisition process to acquire the print target data, the first size information, and the second size information.

<Step S12>

In step S12, the control portion 7 executes a trimming process to adapt the size of the print target data acquired in step S11 to the size of the print target sheet based on the first size information acquired in step S11.

<Step S13>

In step S13, the control portion 7 executes an area setting process to set the print target area in the print target data that has been subjected to the trimming process in step S12, based on the second size information acquired in step S11.

<Step S14>

In step S14, the control portion 7 executes the obfuscation process on the print target data in which the print target area has been set in step S13. The processes of steps S11 to S14 are executed by the data processing portion 71 of the control portion 7.

<Step S15>

In step S15, the control portion 7 conveys the print target sheet from the sheet feed cassette 11.

\<Step S16\>

In step S16, the control portion 7 executes, by using the image reading portion 5, a reading process to read image data of the print target sheet. Here, the process of step S16 is executed by the reading processing portion 72 of the control portion 7.

\<Step S17\>

In step S17, the control portion 7 executes a reduction process to reduce the external shape data included in the image data read in step S16, based on the ratio of the size of the print target area to the size of the print target sheet. Here, the process of step S17 is executed by the reduction processing portion 73 of the control portion 7.

\<Step S18\>

In step S18, the control portion 7 executes the blank forming process on the print target data that has been subjected to the obfuscation process in step S14, wherein in the blank forming process, a blank area is formed by using the external shape data that has been reduced in step S17. Here, the process of step S18 is executed by the data processing portion 71 of the control portion 7.

\<Step S19\>

In step S19, the control portion 7, using the image forming portion 3, forms an image on the print target sheet based on the print target data that has been subjected to the obfuscation process in step S14 and the blank forming process in step S18. Here, the process of step S19 is executed by the print processing portion 74 of the control portion 7.

As described above, in the image forming apparatus 10, the blank forming process and the obfuscation process are executed on the print target data, wherein in the blank forming process, the blank area is formed by using the external shape data that has been reduced by the reduction processing portion 73, and in the obfuscation process, the border of the print target area is obfuscated. This makes it possible to set the size of the blank area to a minimum size in preventing the developer from scattering. In addition, even when the external shape data has an irregular outline, and the blank area that is provided in the print target data by using the external shape data has an irregular border, the irregularity of the border is obfuscated by the obfuscation process. It is thus possible to minimize the size of the blank area provided in the print target data, while restricting the image formed on the print target sheet from being degraded in appearance.

In addition, in the image forming apparatus 10, the data processing portion 71 executes the blank forming process after executing the obfuscation process. With this configuration, compared with a configuration in which the blank forming process and the obfuscation process are executed in a reverse order, it is possible to reduce a time period from a time when the image reading portion 5 reads image data of a print target sheet to a time when the image forming portion 3 forms an image on the print target sheet. It is noted that the data processing portion 71 may execute the obfuscation process after executing the blank forming process.

It is noted that the present disclosure is not limited to an inkjet image forming apparatus, but may be applied to an electrophotographic image forming apparatus.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   an image forming portion configured to form an image on a sheet;
   an image reading portion configured to read image data of a print target sheet at, in a sheet conveyance direction, an upstream of an image formation position where the image forming portion forms the image, in a sheet conveyance path;
   a reduction processing portion configured to reduce external shape data included in the image data read by the image reading portion, based on a ratio of a size of a print target area that is set in a print target data, to a size of the print target sheet, the external shape data representing an external shape of the sheet;
   a data processing portion configured to execute a blank forming process to form a blank area in the print target data by using the external shape data that has been reduced by the reduction processing portion, and to execute an obfuscation process to obfuscate a border of the print target area; and
   a print processing portion configured to cause the image forming portion to form an image on the print target sheet based on the print target data that has been subjected to the blank forming process and the obfuscation process executed by the data processing portion.

2. The image forming apparatus according to claim 1, wherein
   the data processing portion executes the blank forming process after executing the obfuscation process.

3. The image forming apparatus according to claim 1, wherein
   the blank forming process is a mask process to mask an outside of the external shape data by overlaying the external shape data on the print target data.

4. The image forming apparatus according to claim 1, wherein
   the obfuscation process is a density reduction process to reduce image density of a processing target area that includes a border of the print target area, gradually toward an outside of the print target area.

5. The image forming apparatus according to claim 1, wherein
   the image forming portion forms the image on the sheet by ejecting ink.

6. An image forming method executed in an image forming apparatus including an image forming portion configured to form an image on a sheet, and an image reading portion configured to read image data of a print target sheet at, in a sheet conveyance direction, an upstream of an image formation position where the image forming portion forms the image, in a sheet conveyance path, the image forming method comprising:
   reducing external shape data included in the image data read by the image reading portion, based on a ratio of a size of a print target area that is set in the print target data, to a size of the print target sheet, the external shape data representing an external shape of the sheet;
   executing a blank forming process to form a blank area in the print target data by using the external shape data that has been reduced in the reducing, and executing an obfuscation process to obfuscate a border of the print target area; and
   causing the image forming portion to form an image on the print target sheet based on the print target data that has been subjected to the blank forming process and the obfuscation process.

\* \* \* \* \*